INVENTORS
GERALD F. HARLAM
MARIAN A. OKOLOWICZ

United States Patent Office 3,421,924
Patented Jan. 14, 1969

3,421,924
METHOD AND APPARATUS FOR COATING ARTICLES
Gerald F. Harlam, Providence, and Marian A. Okolowicz, Cranston, R.I., assignors to Pilling Chain Co., Inc., West Barrington, R.I., a corporation of Delaware
Filed June 1, 1965, Ser. No. 460,310
U.S. Cl. 117—66      24 Claims
Int. Cl. B05b 15/00

ABSTRACT OF THE DISCLOSURE

A method and apparatus for coating articles wherein the articles, constructed with pivotally mounted elements, are first oriented by means of a vibrating hopper and thereafter transported to a carrier having a helically extending peripheral track for receiving the articles, said track being continuous in length and extending from the upper end of the carrier to the lower end. The carrier is transferred to a coating station and is rotated at a speed that is sufficient to pivotally elevate the depending elements by centrifugal force to a substantially horizontal, outwardly extending position and while in this position coating material is sequentially applied so as to effectively coat all of the external surfaces of the articles.

---

The present invention relates to a method and apparatus for applying a coating material to a plurality of articles. More particularly, the present invention relates to the method and apparatus for coating metallic articles, wherein each of the articles includes a pivotally mounted portion to both sides of which the coating material is applied during the coating operation.

Although the present invention has general application in the coating of metallic articles, the method and apparatus embodied herein are specifically designed to be employed for the coating or enameling of zipper sliders that are used in slide fastener assemblies. Zipper sliders are normally constructed with tab elements that are pivotally mounted thereon. Therefore in the procedures known heretofore in the coating of such articles, racks on which the sliders were mounted during the coating operation had to be physically reversed after a first coating was applied to the sliders so as to shift the position of the tab elements for exposing the portion of the slider bodies that was covered by the tab elements during the initial application of the coating material. A second coating was then applied to the bodies to complete the coating operation. The prior known techniques and procedures employed heretofore for coating sliders was not only laborious but was also costly because of the labor and materials that were required for carrying out the coating operation. The present invention defines a unique departure in the coating of zipper sliders and is substantially automatic in operation after the sliders have been loaded onto a carrier by a loading device. The loading device which also forms one of the novel features of the invention automatically loads the zipper sliders onto the carrier in oriented relation, wherein the tab elements of the sliders are disposed outwardly of the carrier and in suspended relation with respect thereto.

In carrying out the coating operation embodied in the present invention, the carrier on which the sliders are mounted in oriented relation is placed on a continuously moving conveyor for transfer through a coating station. Prior to movement into the coating station, the carrier is automatically interengaged with a belt drive for causing rotation thereof. The belt drive for rotating the carrier is driven at a speed such that the rotational speed of the carrier is sufficient to cause the tab elements of the sliders to be pivotally moved upwardly under centrifugal force. Thus, when the carrier enters the coating station, it is not only moving in a traversing direction but is also being rotated so as to cause the tab elements of the sliders mounted thereon to be disposed in an outwardly extending direction. As the carrier moves through the coating station, a pair of spray guns located upstream and downstream thereof are elevated and are automatically operated in sequential timed relation, the upstream gun being initially operative during the elevating movement for directing coating material onto the exposed outer surfaces of the sliders and the outwardly positioned tab elements thereof. The rotational speed of the carrier is also sufficient to counteract the forces generated by the coating material that is being sprayed thereon from the upstream gun for maintaining the tab elements in the outwardly extending position thereof. When the spray guns reach the upper position, the upstream gun is automatically cut off and the guns then dwell in the upper position for a brief interval. During this dwell period, a third spray gun which has been traversing above the carrier is moved downwardly into the interior thereof and at the same time directs coating material onto the surfaces of the sliders that project into the interior of the carrier. After completion of the interior coating operation, the third spray gun is withdrawn from the carrier interior and the upstream and downstream guns are then lowered to the original position thereof. As these guns descend the downstream gun is operated to again spray coating material on the outer surfaces of the sliders and to further coat the upper surfaces of the tab elements. By providing the upstream and downstream guns, one spraying upwardly and one spraying downwardly, both surfaces of the tab elements are sufficiently coated and since the sliders are rotated with the carrier, a plurality of coats of the coating material are applied to the surfaces of the sliders to impart a uniformly coated finish thereto.

Upon completion of the coating operation, the carrier which is continuously moving on the conveyor is transferred through a baking oven, the carrier being continuously rotated during the baking operation. The period of travel through the baking oven is sufficient to cure and harden the coating material applied to the surfaces of the sliders and tab elements thereof. After the baking operation, the carrier is then transferred to an unloading station where the coated sliders are removed therefrom. Following the unloading operation the carrier is stripped of the coating material by a convenient stripping process and may thereafter be loaded with uncoated sliders for transfer to the coating station.

Accordingly it is an object of the present invention to provide apparatus for applying a coating material to a plurality of articles.

Another object of the invention is to teach a method of applying a coating material to a plurality of articles.

Still another object is to provide apparatus for coating zipper sliders by transferring a carrier on which the sliders are mounted through a coating station, the carrier being continuously rotated during the coating operation to elevate the tab elements of the sliders, thereby exposing all of the surfaces of the tab elements for application of the coating material thereto.

Still another object is to provide a unique carrier construction on which zipper sliders are received in oriented relation, the carrier being transferred to a coating station and simultaneously rotated during the transferring movement thereof, so as to provide for coating of all the exposed surfaces of the sliders mounted thereon.

Still another object is to provide a unique arrangement of spray guns at a coating station and means for the operation of said spray guns in sequential relation to as to effectively coat a plurality of sliders that are transferred to the coating station on a carrier.

Still another object is to teach a method of loading zipper sliders onto a carrier and transferring the carrier to a coating station while simultaneously rotating the carrier for effectively exposing all of the surfaces of the sliders for the coating thereof at the coating station.

Other objects, features and advantages of the invention will become apparent as the description thereof proceeds when considered in connection with the accompanying illustrative drawings.

In the drawings which illustrate the best mode for presently carrying out the invention.

Figure 1:
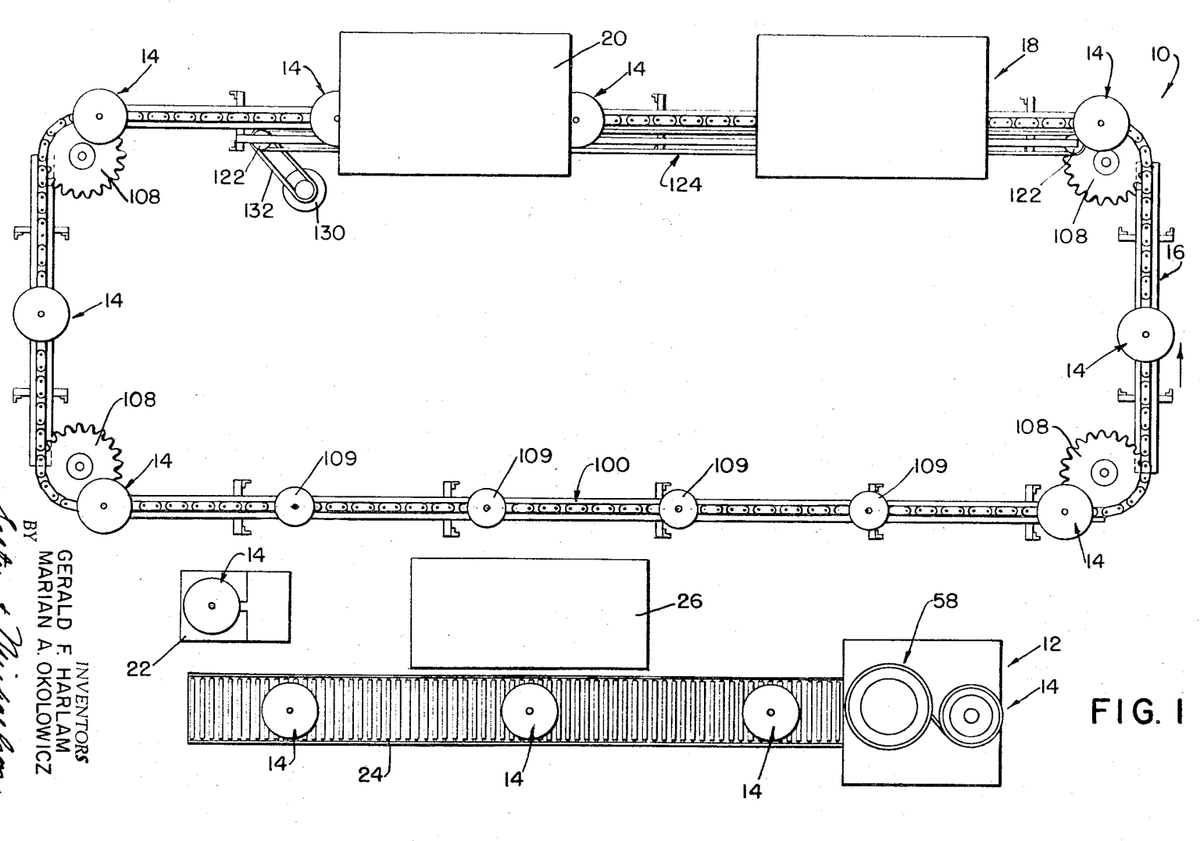
FIG. 1 is a top plan view of the apparatus embodied in the invention for applying a coating material to a plurality of metallic articles.

Referring now to the drawings and particularly to FIG. 1, a plan view of the apparatus embodied in the invention for coating a plurality of articles is illustrated, the apparatus being generally referred to at 10. The coating apparatus 10 is generally designed to be employed for the coating of a plurality of articles. However, in the more specific use of the invention, the apparatus 10 is adapted to process articles for the coating thereof wherein at least a portion of each of the articles, is mounted for pivotal movement. As a practical matter, the apparatus 10 is employed in the coating or enameling of metallic zipper sliders, and reference to the zipper sliders will be made hereinafter in the description of the invention. It will be understood, however, that in the broad concept of the invention, articles other than zipper sliders may be processed by the apparatus 10 without departing from the spirit of the invention.

As shown in FIG. 1, the apparatus 10 includes a loading station generally indicated at 12 at which the articles to be coated such as zipper sliders are mounted on a suitable transfer device or carrier generally indicated at 14. A plurality of the carriers 14 are continuously transferred by a moving main conveyor, generally indicated at 16, through a coating station generally indicated at 18, and a baking station 20, the carriers being removed for unloading of the sliders therefrom at an unloading station 22. An auxiliary roller type conveyor 24 is located adjacent to the conveyor 16 and provides for convenient transfer of the carriers from the unloading station 22 to the loading station 12. Located intermediate the loading and unloading stations is a stripping tank 26, the purpose of which will be hereinafter described.

Figure 15:
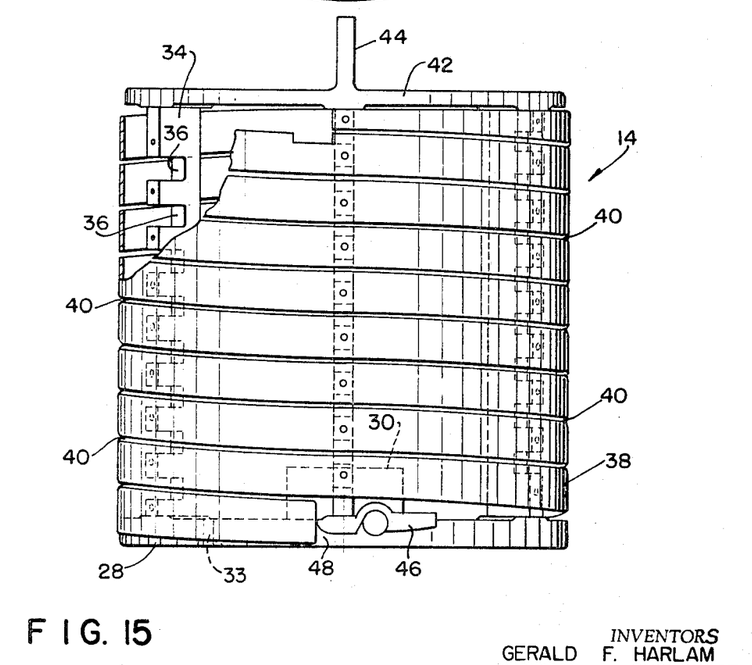
FIG. 15 is an elevational view with portions broken away showing the carrier on which the sliders are mounted during the processing thereof.
Figure 16:
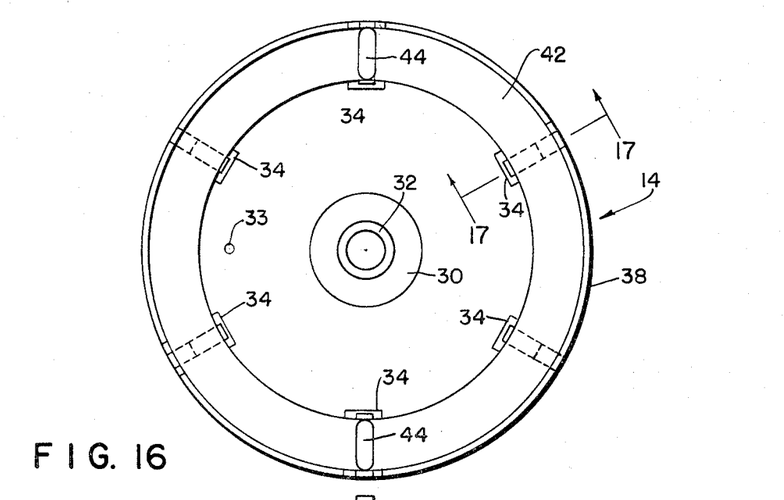
FIG. 16 is a top plan view of the carrier illustrated in FIG. 15.

In order to provide for automatically loading the zipper sliders onto the carrier 14 in oriented relation and with a minimum of time and labor expended, the carrier 14 is constructed in a novel manner, and reference is now made particularly to FIGS. 15 and 16. The carrier 14 is generally cylindrical in configuration and includes a base 28 to the interior surface of which an upstanding hub 30 is joined, the hub 30 having a central opening formed therein in which a bushing 32 is positioned. The bushing 32 is designed to receive a shaft therein that is formed as part of the conveyor 16, when the carrier 14 is mounted on the conveyor 16 as will hereinafter be described. Formed in the base 28 is an opening 33 that is adapted to receive a driving stud that is secured to a mounting plate on the conveyor, the driving stud providing for rotation of the carrier 14. Joined to the base 28 adjacent to the periphery thereof and extending therearound in spaced relation are a plurality of vertically extending ribs 34. As shown in FIG. 15, each of the ribs has a plurality of grooves or slots 36 formed therein, the slots 36 in one rib 34 being staggered in vertical relation with respect to the slots 36 in the other ribs. The ribs 34 combine with a continuously extending metallic strip 38 to define the body portion of the carrier 14, the continuously extending metallic strip 38 being wound in a spiral or helical manner on the outer surfaces of the ribs 34 and being secured thereto by any convenient means such as screws or the like. The adjacent edges of the continuously extending metallic strip 38 are located in spaced-apart relation, the adjacent edges of the strip 38 defining a helically extending track 40 on which the sliders are received and that extends from the upper end of the carrier 14 to the lower end thereof. It is seen that the staggering of the grooves or slots 36 in the ribs 34 provides for the continuous extension of the track 40 as defined by the adjacent edges of the metallic strip 38. As will further be described, the track 40 as defined by the spaced-apart edges of the metallic strip 38 is so arranged as to provide for receiving the slotted ends of the sliders therein for the loading of the sliders on the carrier 14. The uppermost end of the carrier 14 is defined by a top ring 42 that is joined to the upper ends of the ribs 34, the inner diameter of the top ring 42 being of such a dimension as to provide for easy access to the interior of the carrier 14. In order to lift the carrier 14 for transfer thereof from one location to another, the top of the ring 34 is formed with upstanding ears 44, the ears 44 being disposed in opposed relation for convenience in the lifting of the carrier 14.

During loading of the zipper sliders on the track 40 of the carrier 14, the sliders are introduced at the topmost end of the carrier and are slidably moved along the helical track 40 to the lowermost end of the carrier. In order to provide a positive stop at the lower end of the carrier and at the end of the helical track 40, a pivoted stop member 46 is provided and is movable into communication with a discharge slot 48 that is located adjacent to the lower end of the track 40. The sliders are thus moved downwardly on the track 40 until the lowermost of the sliders engages the stop 46, the remaining sliders then backing up on the track 40 until the track is completely filled with sliders. After the coating operation and when it is required to unload the sliders from the carrier 14, the stop member 46 is pivoted from the stop position to enable the sliders to fall downwardly from the track 40 through the discharge slot 48.

Figure 2:
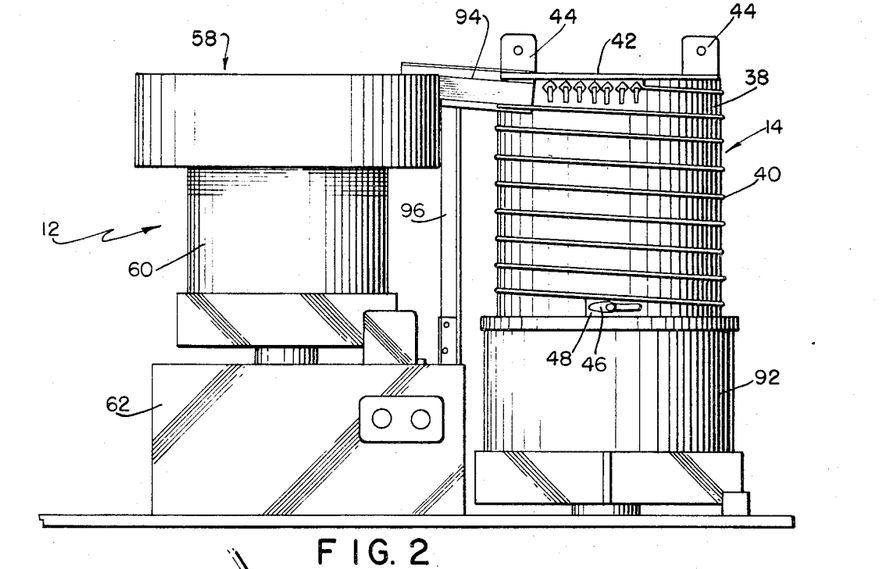
FIG. 2 is a side elevational view of the loading station showing a loading hopper, and a carrier located adjacent to the loading hopper for receiving articles therefrom in oriented relation.
Figures 4, 6:
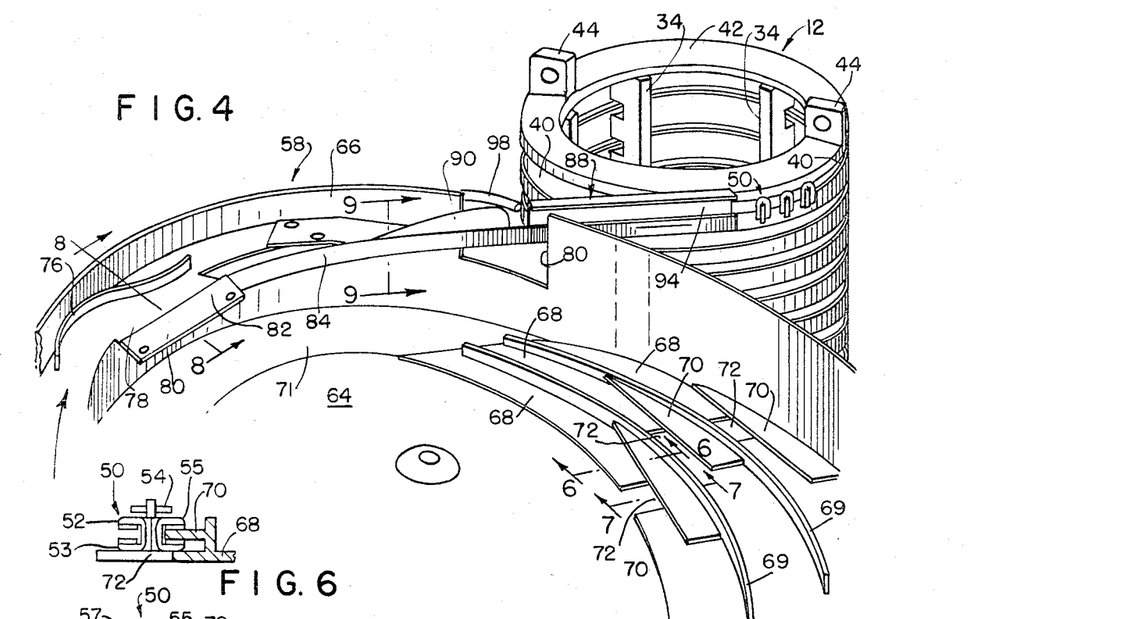
FIG. 4 is a perspective view of the loading hopper and carrier located adjacent thereto, wherein the track construction in the hopper that is provided for orienting the zipper sliders prior to mounting on the carrier is illustrated.
FIG. 6 is a sectional view taken along lines 6—6 in FIG. 4.
Figures 5, 7, 8, 9:
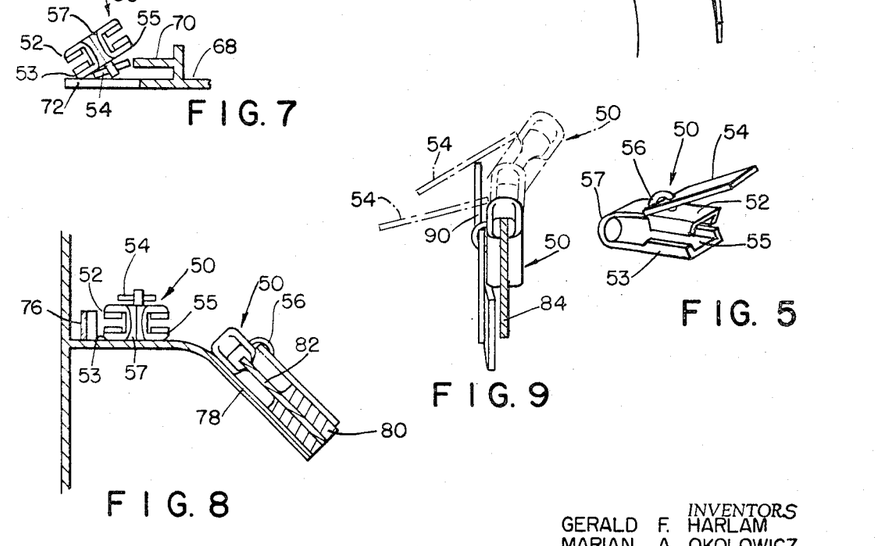
FIG. 5 is a perspective view of a zipper slider of the type that is adapted to be coated by the apparatus embodied herein.
FIG. 7 is a sectional view taken along lines 7—7 in FIG. 4.
FIG. 8 is a sectional view taken along lines 8—8 in FIG. 4.
FIG. 9 is a sectional view taken along lines 9—9 in FIG. 4.

As mentioned hereinabove, the apparatus embodied herein is designed for particular use in the coating of zipper sliders, one of which is generally indicated at 50 in FIG. 5. The slider 50 as illustrated is conventional in construction and includes a body that is folded to define spaced front and rear portions 52 and 53 that are separated by a slot 55. Pivotally joined to the front portion 52 of the slider 50 by a loop 56 is a tab element 54, the closed end of the body portions being indicated at 57. As will be described hereinafter, each of the sliders 50 is mounted in oriented position on the track 40 of the carrier 14 by locating the sliders such that the lower edge of the strip 38 is received between the portions 52 and 53 and in the slot 55, the closed end 57 of the sliders being located in the upper position, and the tab elements 54 being normally disposed in free depending relation as illustrated in FIGS. 2 and 4.

In order to mount the sliders 50 in the oriented position on the track 40 of the carrier 14, the loading device 12 is employed and includes a loading hopper generally indicated at 58 that is mounted on a vibrating table 60.

The vibrating table 60 is of the "Syntron" type that is vibrated at a controlled frequency so as to circulate the sliders 50 within the hopper 58 in a prescribed manner. It is understood that the "Syntron" vibrator 60 that is mounted on a base 62 in the conventional manner, may be controlled as desired to produce any required movement of the sliders. Referring to FIGS. 4 and 6 through 9, the hopper 58 is shown in detail and includes a conical bottom wall 64 to which a peripheral side wall 66 is joined. The sliders 50 are dumped into the hopper in random relation on the bottom wall 64 and due to the controlled vibrating action imparted by the vibrator 60 will move in a clockwise direction as indicated by the arrow in FIG. 4. Since the sliders 50 must be fed to the carrier 14 in the oriented relation as described, it is necessary that they be properly positioned by the hopper 58 prior to the feeding thereof onto the track 40 of the carrier. The initial step in the orienting of the sliders 50 is to insure that all of them are first located with the tab elements 54 thereof in the up position. This is accomplished by moving the sliders 50 onto a plurality of horizontal and parallel selector tracks 68 that are separated by guide rails 69. Each of the tracks 68 is constructed substantially identical and extends around a portion of the hopper 58 and is joined by a feed track 71 that spaces the tracks 68 from the bottom wall 64. As the vibrating hopper 60 transfers the sliders from the feed track 71 onto the selector tracks 68 the sliders will advance on the tracks 68 for contact with selector blades 70. The selector blades 70 are spaced from the tracks 68 in parallel relation therewith and are positioned at a height for communication with the slot 55 in the slider 50, provided that the slider is riding on its rear portion 53 with the tab element 54 located in the up position. As seen in FIG. 6, the slider 50 illustrated therein is disposed in the proper oriented position for receiving a selector blade 70 in the slot 55 thereof. If any of the sliders 50 are disposed such that the tab element 54 is on the underneath side when the sliders are advanced onto the selector tracks 68, the slots 55 thereof will not align with a selector blade 70, such as illustrated in FIG. 7 and will not be retained thereon. The non-aligned sliders can only advance along a portion of the selector blades 70, being discharged therefrom and the tracks 68 by falling through openings 72 formed in each of the tracks 68.

With the sliders 50 now located in the right side up position, the next step in advancing them to the carrier 14 in oriented relation is positioning the sliders such that the tab elements 54 will be disposed outwardly of the track 40 as mounted on the carrier 14. The final orientation of the sliders 50 occurs as the sliders are moved along the tracks 68 in clockwise direction and toward the carrier loading area. Referring again to FIG. 4, a curved guide 76 that is secured to the extension of the selector tracks 68 deflects the sliders 50 towards an inclined track portion 78. Mounted on the inclined track portion 78 is a block 80 to which a pick-up blade 82 is secured. As illustrated in FIG. 8, the sliders are cascaded downwardly toward the pick-up blade 82 by deflection off of the guide 76. When a slider 50 is located in proper oriented position, the tab element 54 will be disposed on the outwardly facing side of the slider as seen in FIG. 8 as the slider is moved onto the pick-up blade 82. In this position, the slider is adapted to be mounted on the track 40 of the carrier 14 such that the tab element 54 thereof is facing outwardly. The mounting of the sliders 50 on the track 40 of the carrier 14 is accomplished by feeding the sliders from the pick-up blade 82 to a loading track 84 that communicates therewith and that is slightly twisted so as to direct the sliders from an inclined position as illustrated in FIG. 8 to a vertical position for movement onto the track 40 of the carrier 14. As further seen in FIG. 4 the loading track 84 extends through an opening 86 formed in the side wall 66 of the hopper 58, and as will be described, directs the sliders 50 onto an intermediate bridge generally indicated at 88. If the sliders 50 as deposited on the pick-up blade 82 and directed to the loading track 84 are disposed such that the tab elements 54 thereof are located inwardly of the sliders, proper mounting of the sliders on the carrier track 40 will not occur. Thus, these sliders must be rejected and for this purpose a rejecting blade 90 is provided and is located rearwardly of the loading track 84. As seen in FIG. 9, the rejector blade 90 extends upwardly with respect to the track 84 and is adapted to be contacted by the tab element 54 if the slider 50 as mounted on the track 84 is reversed in the required position thereof. Thus as illustrated in FIG. 9, advancing of the improperly oriented sliders toward the carrier 14 and on the track 84 will cause the reversely located tab element 54 to ride up on the rejector blade 90, thereby lifting the improperly positioned sliders 50 from the track 84 for deposit into the hopper 64 for feeding once again onto the selector tracks 68.

Figure 3:
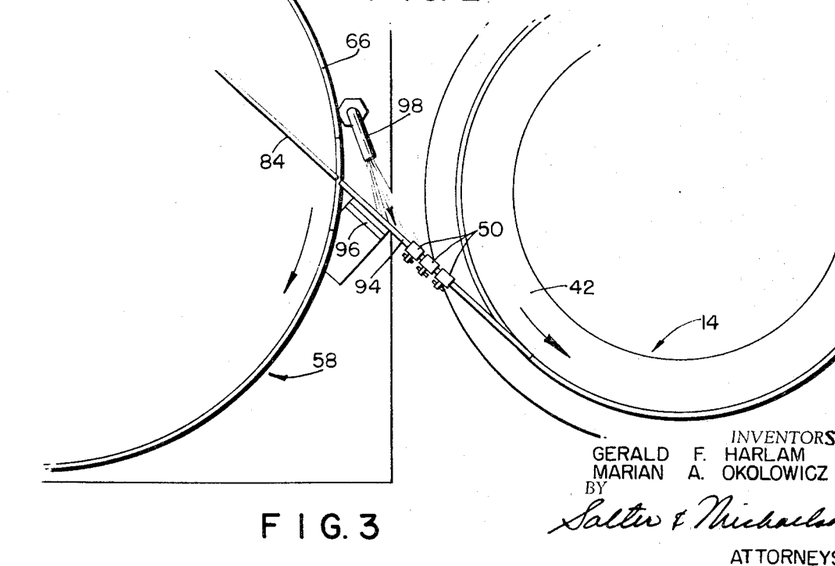
FIG. 3 is a fragmentary top plan view of the loading station illustrated in FIG. 2 showing the device for propelling the articles to be coated from the loading hopper to the article carrier.

During the loading operation, the carrier 14 is also mounted on a "Syntron" type vibrator indicated at 92 in FIG. 2, the vibrator 92 being controlled to vibrate the carrier 14 so as to cause the sliders to move along the track 40 in a counter-clockwise direction, or in a direction following the helically extending track 40 from the topmost end thereof to the bottommost end thereof. Since the hopper 58 and the carrier 14 are being vibrated with respect to each other so as to reverse the flow of the sliders as they travel from the hopper to the carrier, it is necessary that an independent structure be employed for guiding the sliders from the hopper 58 onto the track 40 of the carrier 14. By providing the independent structure, a continuous flow of the sliders is maintained through the shortest possible interconnection. This independent structure as shown in FIGS. 2, 3, and 4 is defined by the bridge 88 that includes a track 94 mounted upon a vertical standard 96 that is, in turn, secured to the base 62. The track 94 is spaced from the track 84 of the hopper and the track 40 of the carrier 14, but in the loading position thereof the track 94 is disposed closely adjacent to these tracks for communication therewith. This close relation of the track 94 with respect to the opposite tracks 84 and 40 is illustrated more clearly in FIG. 3. During the feeding operation of the hopper 58, the vibration thereof will cause the sliders moving along the loading track 84 to move onto the track 94 of the bridge 88. However, since the bridge 88 is mounted independently of the tracks 84 and 40, a source of air under pressure is employed and is expelled from a pipe 98 located on the upstream side of the track 94 for propelling the sliders onto the track 40. The pipe 98 is positioned adjacent the outer surface of the side wall 66 of the hopper 58 and the nozzle thereof is directed toward the track 94 and at an angle with respect thereto. The air under pressure expelled from the pipe 98 thus strikes the sliders that have been directed onto the track 94 from the track 84 and propels them over the track 94 and onto the track 40 of the carrier 14. As the sliders move onto the track 94 the vibrating movement of the carrier 14 then feeds the sliders along the helically extending track 40 toward the bottom end thereof.

After the carrier 14 is loaded with the sliders 50, it is removed from the loading station 12 and then placed on the conveyor 16 for subsequent transfer to the coating station 18 and baking station 20.

Figure 10:
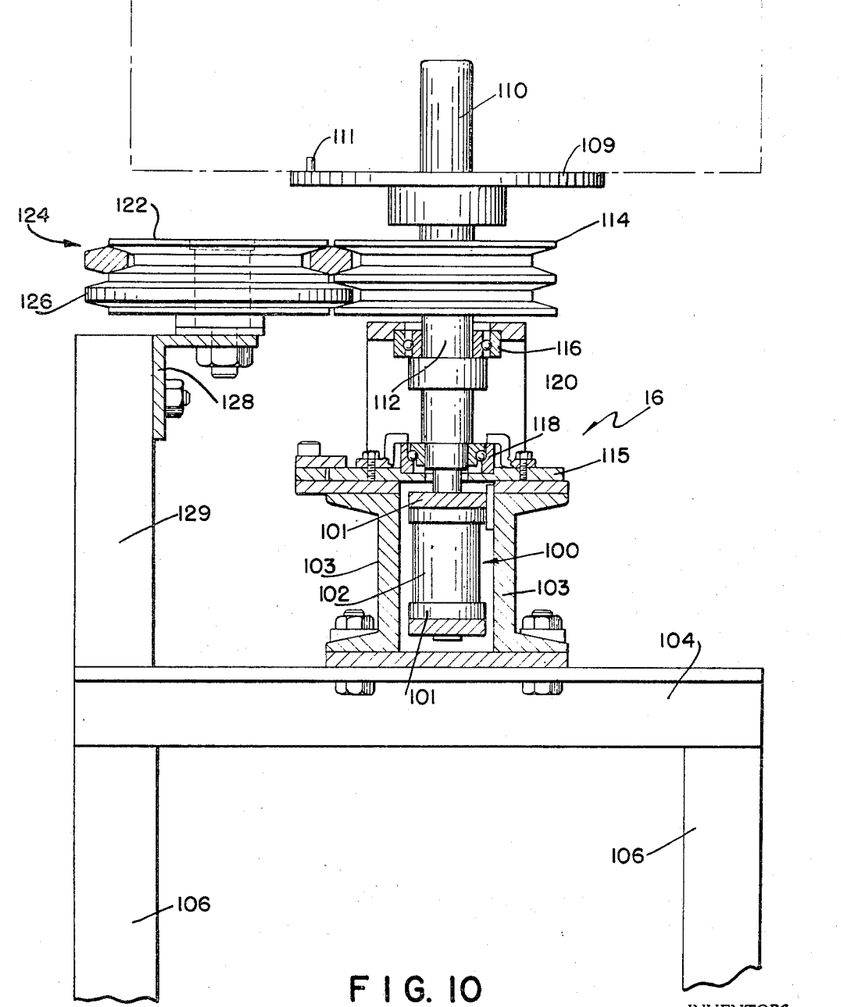
FIG. 10 is a sectional view with parts shown in elevation showing the conveyor for transferring the carrier through the various stations, and further showing the belt drive for rotating the carrier during movement through the coating and baking stations.

As shown in FIGS. 1 and 10, the conveyor 16 includes a conventional chain link assembly 100 that includes spaced links 101 that are connected together by pins 102, the chain link assembly being mounted for movement between elongated beams 103. The beams 103 are secured in pairs to spaced cross members 104 that are mounted on conventional standards 106. Corner gears 108, intermesh with the chain link assembly 100 and a convenient drive (not shown) is interconnected to one of the corner gears 108 for producing the required traveling movement of the conveyor 16. As will be described hereinafter, the carriers 14 when transferred through the coating station 18 and baking station 20 are rotatably driven and for this purpose a plurality of mounting plates 109 are mounted for rotation on the chain link assembly 100. Each of the mounting plates 109 has an upstanding shaft 110 joined thereto that is adapted to be received within the bushing 32 of a carrier 14, when the carrier is placed in position on the mounting plate 109. In addition a driving stud 111 is secured to the plate 109 and is received within the opening 33 of the carrier base 28 for drivingly interconnecting the mounting plate 109 to the carrier 14.

As shown in FIG. 10 the mounting plate 109 is secured to a shaft 112 that also receives a pulley 114 thereon, the pulley 114 having a double groove formed therein. The shaft 112 is rotatably secured in spaced bearings 116 and 118 that are fixed in position in a bearing housing 120 that is mounted for movement with the chain link assembly 100 through a plate 115.

Referring again to FIG. 1, a pulley drive generally indicated at 124 is shown positioned along the length of the conveyor 16 that passes through the coating station 18 and baking station 20. The pulley drive 124 consists of a plurality of spaced pulleys 122 which as shown in FIG. 10 are also formed with a double groove configuration. Belts 124 and 126 engage the pulleys 122 for the driving thereof, the pulleys 122 being conveniently mounted in position on a bracket 128 that is fixed to a vertical member 129 mounted on a cross member 104. A suitable motor drive 130 located at one end of the pulley drive 124 and connected to a pulley 122 through a belt 132 is provided, the pulley drive being independent of the drive for the conveyor 16. When the conveyor 16 moves the carrier toward the coating station 18 it is seen that the double groove pulley 114 on which each of the mounting plates 109 is mounted is adapted to frictionally engage the belts 124 and 126 of the pulley drive 124. Since the pulley drive 124 is continuously operated, movement of the pulley 114 into frictional contact with the belts 124, 126 will result in driving movement therebetween, thereby causing rotation of the pulley 114 and a corresponding rotating movement of the mounting plate 108 and carrier 14 located thereon. As again seen in FIG. 1, the mounting plates 109 are disposed in spaced relation on the chain link conveyor 16 and are transferred therewith upon operation of the conveyor. As each of the carriers 14 is placed in position on a mounting plate 109, the conveyor 16 moves the carrier 14 in a direction toward the coating station 18 and baking station 20. As the carrier 14 approaches the coating station 18, the mounting plate 109 on which the carrier is mounted is caused to rotate as its pulley 114 engages the belts 124 and 126 of the pulley drive 124. Thus as the carrier enters the coating station 18 it is rotating at a predetermined speed.

One of the objects of the invention is to effectively apply a coating material to the exterior surfaces of the sliders 50. Since the tab elements 54 of the sliders 50 are normally disposed in a depending position, as mounted on the track 40 of the carrier 14, these tab elements 54 must be lifted from the depending position during the coating operation in order to effectively coat the surfaces of the slider portions 52 located under the tab elements. It is for this reason that the carrier 14 is rotated as it moves into the coating station 18. Because of the free hanging position of the tab elements 54, the rotational speed of the carrier 14 is sufficient to raise or elevate the tab elements 54 upwardly under centrifugal force. Thus as a carrier 14 enters the coating station 18 the tab elements 54 of the sliders are moved upwardly under centrifugal force to expose all of the outer surfaces of the sliders 50 for receiving a coating material thereon. As will be further described hereinafter, the rotational speed of the carrier 14 is sufficient to retain the tab elements in the outwardly extending position thereof notwithstanding the forces generated by the spray devices in applying the coating material on the sliders.

Because of the position of the tab elements 54 in the elevated location thereof, it is seen that provision must be made for coating both the upper and lower surfaces thereof with the coating material. For this purpose a unique constructional arrangement of a plurality of spray guns is provided that are operated in sequential relation. Referring to FIGS. 11 through 14, the spraying apparatus is illustrated and includes a first spray gun assembly generally indicated at 132 and that is located upstream of the carrier 14 during the coating operation. A second spray gun assembly generally indicated at 134 is spaced from the assembly 132 and is located downstream of the carrier 14 during the coating operation. A third spray gun assembly generally indicated at 136 is located upwardly with respect to the moving carrier 14 and is designed to apply the coating material on the surfaces of the sliders that are disposed interiorly of the carrier. The spray gun assemblies 132, 134 and 136 are adapted to be operated in sequential relation and in accordance with movement of the carrier through the coating station 18 for effectively applying a coating material onto all of the exposed surfaces of the sliders 50 as mounted on the carrier 14. Since all of the spray gun assemblies are enclosed within the coating station 18, a housing of any convenient form may be provided that forms a shield during the spraying operation, the housing being open at the ends thereof for receiving the conveyor 16 that transfers the carriers 14 therethrough.

Mounted on a vertical member 138 in the coating station 18 is the first spray gun assembly 132 that includes spaced slides 140 that are conveniently secured in position to a bracket 142, a slide block 144 being slidably mounted for vertical movement on the slides 140. Operatively connected to the slide block 144 is a piston rod 146 that is mounted for reciprocating movement in an air cylinder (not shown). A spray gun 148 is mounted on the slide block 144 through a bracket construction 150 and has the usual hose connections secured thereto for the supplying of a coating material under pressure as required. The spray gun 148 has a nozzle 151 joined thereto that is pointed in an upwardly inclined direction for directing the coating material toward the sliders 50 in an upward direction. The second spray gun 134 is constructed substantially identical to the spray gun assembly 132 and includes a bracket 152 that is mounted on a vertical member 154. Spaced slides 156 are secured to the bracket 152 and receive a slide block 158 for vertical movement thereon. A piston rod 160 is operatively connected to the slide block 158 and extends into an air cylinder (not shown) that is operated to cause reciprocating movement of the rod 160 and slide block 158 joined thereto. A spray gun 162 is secured to the slide block 158 by a bracket 164, the spray gun 162 including a nozzle 168 that is directed generally downwardly for spraying the coating material in a downward direction. As will be described, the slide blocks 144 and 158, as controlled by movement of the piston rods 146 and 160, are adapted to be moved in unison, although it will be observed that the spray gun 162 is located slightly above the elevation of the spray gun 148 in the normal position. Thus during the coating operation the spray guns 148 and 162 will first move upwardly together to an upward position and then after a dwell period will move downwardly together to the original position. It is pointed out here that during upward movement of the spray guns 148 and 162 only the spray gun 148 is operated, while during downward movement thereof only the spray gun 162 is operated. As will be described, the sequential operation of the spray guns in this manner will effectively coat both the upper and lower surfaces of the tab elements 54 during the coating operation.

Since the rear portion 53 of the sliders 50 is located within the carrier interior as mounted on the track 40 and cannot be reached by the spray guns 148 and 162, the spray gun assembly 136 is provided and is adapted to be inserted within the carrier 14 during the coating operation. As seen in FIGS. 11, 12, 13 and 14, the spray gun assembly 136 includes a spray gun 170 to which an elongated vertical spray head 172 is attached. A spray nozzle 174 is located on the lowermost end of the spray head 172 for directing the coating material outwardly in a generally horizontal direction. The spray gun 170 is not only mounted for vertical reciprocating movement as will be described, but is also mounted for traversing movement and at the same speed as that of the traveling carrier 14 as the carrier is moved by the conveyor 16. In order to traverse the spray gun 170 in the direction of travel of the carrier 14, rods 176 are provided and are suspended from an upper beam 178 by bolts 179. Mounted on the rod 176 for reciprocating movement are bearing blocks 180 to the underside of which a plate 182 is secured. A second plate 184 is joined to the plate 182 and fixed to the plate 184 are vertically spaced bearings 186 that receive an elongated rack 188 for vertical reciprocating movement therein. The spray gun 170 is interconnected to the rack 188 by a suitable connection 190 and thus is movable as a unit with the plates 182, 184, the rack 188 and bearing blocks 180 in a traversing motion in the direction of the carrier. In order to effect the traversing movement of the spray gun 170 an air cylinder 191 is provided and is operatively connected to the plate 182. Upon sequential operation of the cylinder 191 a traversing movement of the assembly 136 that includes the bracket 185, the spray gun 170 and the rack 188 is produced. Thus as the carrier 14 is transferred through the coating station, the spray gun 170 travels therewith and then in proper sequence is lowered within the carrier to apply the coating material to the rear portion 53 of the sliders.

Figure 12:
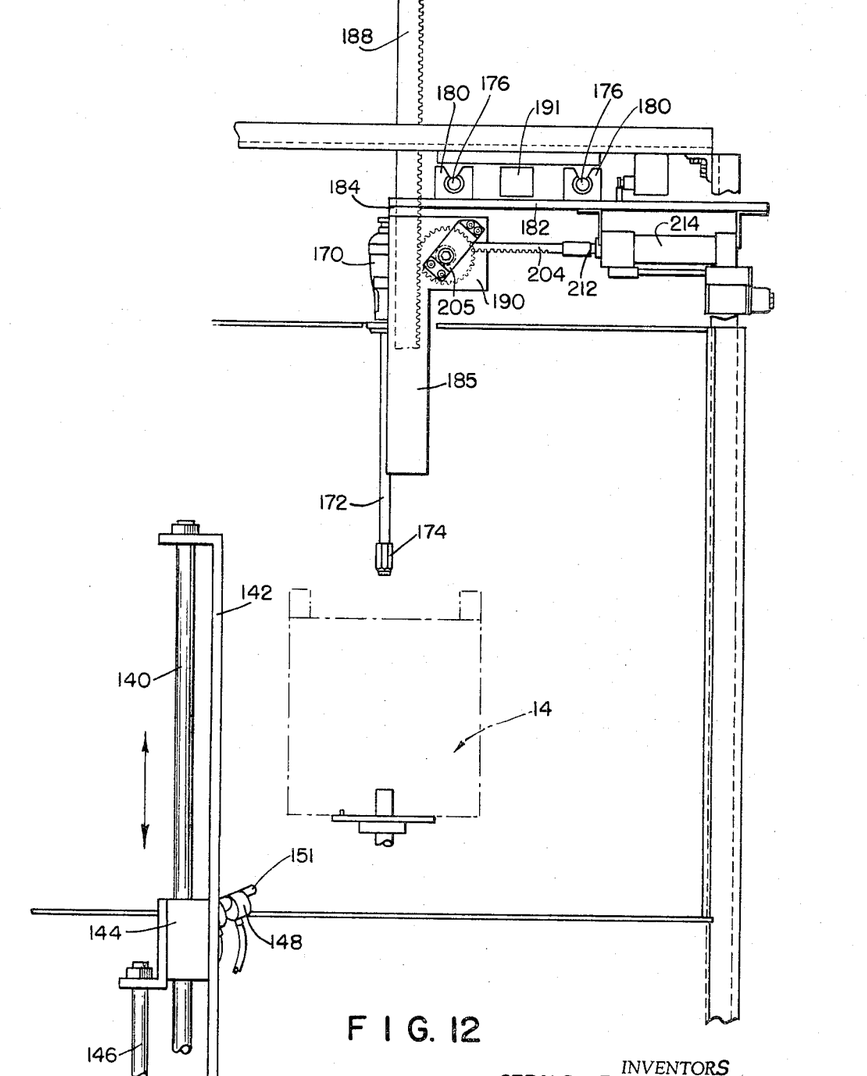
FIG. 12 is a side elevational view of the apparatus illustrated in FIG. 11.
Figures 13, 17:
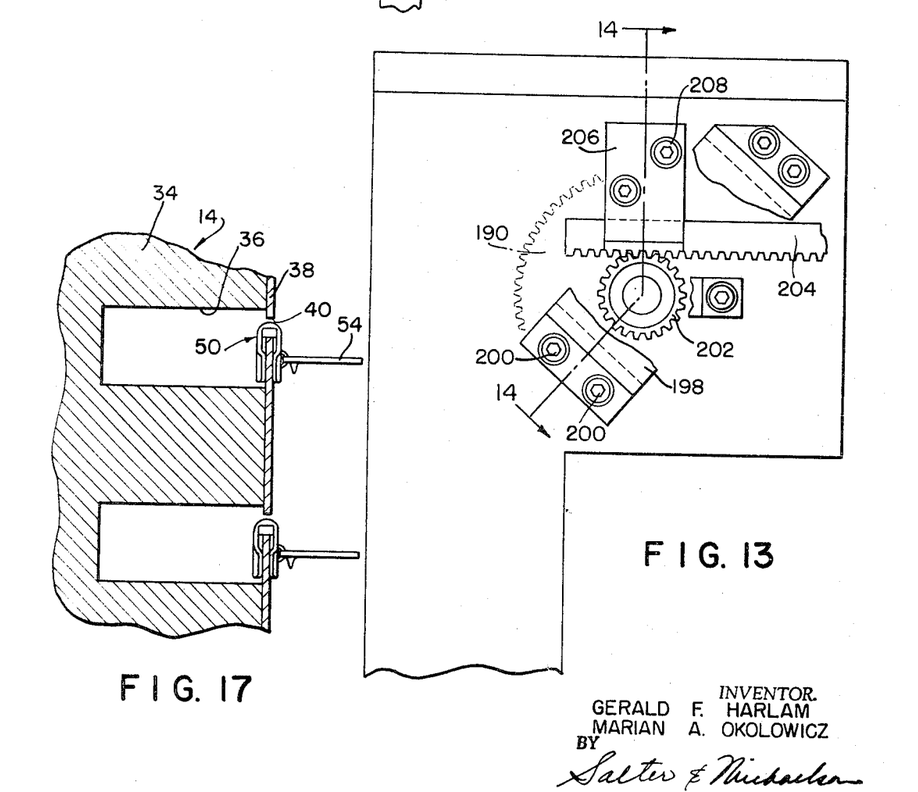
FIG. 13 is an enlarged elevational view with portions broken away showing the drive for vertically moving the interior spray gun.
FIG. 17 is a sectional view taken along lines 17—17 in FIG. 16.
Figure 14:
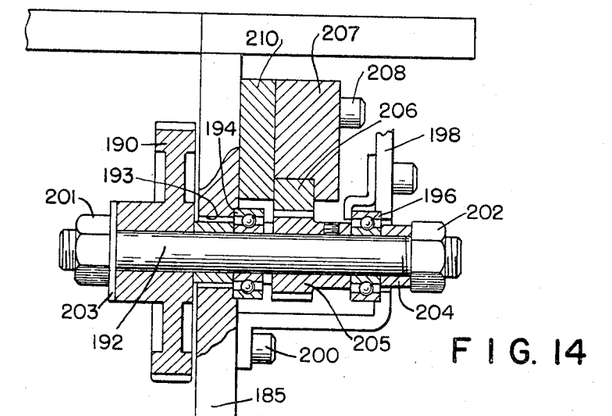
FIG. 14 is a sectional view taken along lines 14—14 in FIG. 13.

In order to produce the vertical movement of the spray gun 170 the rack 188 is intermeshed with a gear 190, which as shown in FIG. 14 is mounted on a shaft 192 that extends through an opening 193 in the bracket 185 and is mounted for rotation therein in spaced bearings 194 and 196. The shaft 192 and the bearings 194, 196 are mounted in position by a bracket 198 that is fixed to the bracket 185 by bolts 200. The ends of the shaft 192 are threaded for receiving nuts 201 and 202, the nut 201 being locked to the hub of the gear 190 by a washer 203, while a bushing 204 spaces the nut 202 from the bearing 196. Also mounted on the shaft 192 for rotation therewith and secured between the bearings 194 and 196 is a pinion 205 to which a rack 206 is operatively connected. The rack 206 is held in position by a block 207 that is secured to the bracket 185 by bolts 208, but is spaced therefrom by a spacer block 210. As shown in FIG. 12, the rack 206 is operatively connected to a piston rod 212 that extends into an air cylinder 214. Since the air cylinder 214 is mounted on the plate 184 and is movable therewith, it is seen that operation of the air cylinder 214 will cause the rack 204 to be reciprocated thereby rotating the pinion 205, shaft 192 and gear 190. Rotation of the gear 190 results in a corresponding vertical movement of the rack 188 and the spray gun 170 operatively connected thereto. Thus as the air cylinder 214 is operated in timed relation the spray gun 170 will descend to lower the nozzle 174 within the interior of the carrier 114.

OPERATION

In the description of the operation of the apparatus embodied in the present invention, it will be assumed that a carrier 14 has been placed on the vibrator 92 at the loading station 12. A plurality of the sliders 50 are dumped at random into the vibrating hopper 58 which then feeds the sliders 50 in oriented relation onto the track 94 of the bridge 88 for transfer to the track 40 of the carrier 14. The loading operation is completed when the sliders 50 have filled the spirally extending track 40 from the bottom to the top thereof. After loading of carrier 14 with the sliders thereon in oriented relation such that the tab elements 54 of the sliders are disposed outwardly and in depending or hanging relation, the carrier is removed from the loading station 12 and placed on a plate 109 that is located adjacent to the loading station and that is moving with the conveyor 16. As the conveyor 16 transfers the carrier 14 to the coating station 18, the pulley 114 to which the plate 109 is interconnected engages the belts 124, 126 of the pulley drive 124 to rotate the plate 109 and the carrier 14 mounted thereon. The rotational speed of the carrier 14 is sufficient to cause the tab elements of the sliders mounted thereon to pivotally move upwardly under centrifugal force to an outwardly extending position. As the rotating carrier 14 enters the coating station 18, a micro-switch (not shown) is actuated to begin the operation of a timer (not shown) that, in turn, controls movement of appropriate solenoid valves that control the operation of the cylinders in which the piston rods 146 and 160 extend. The timer that is actuated by the micro-switch also effects the operation of solenoid valves for controlling operation of the air cylinders 191 and 214 that, in turn, control the movement of the spray gun assembly 136 in a traversing and vertical direction.

Figure 11:
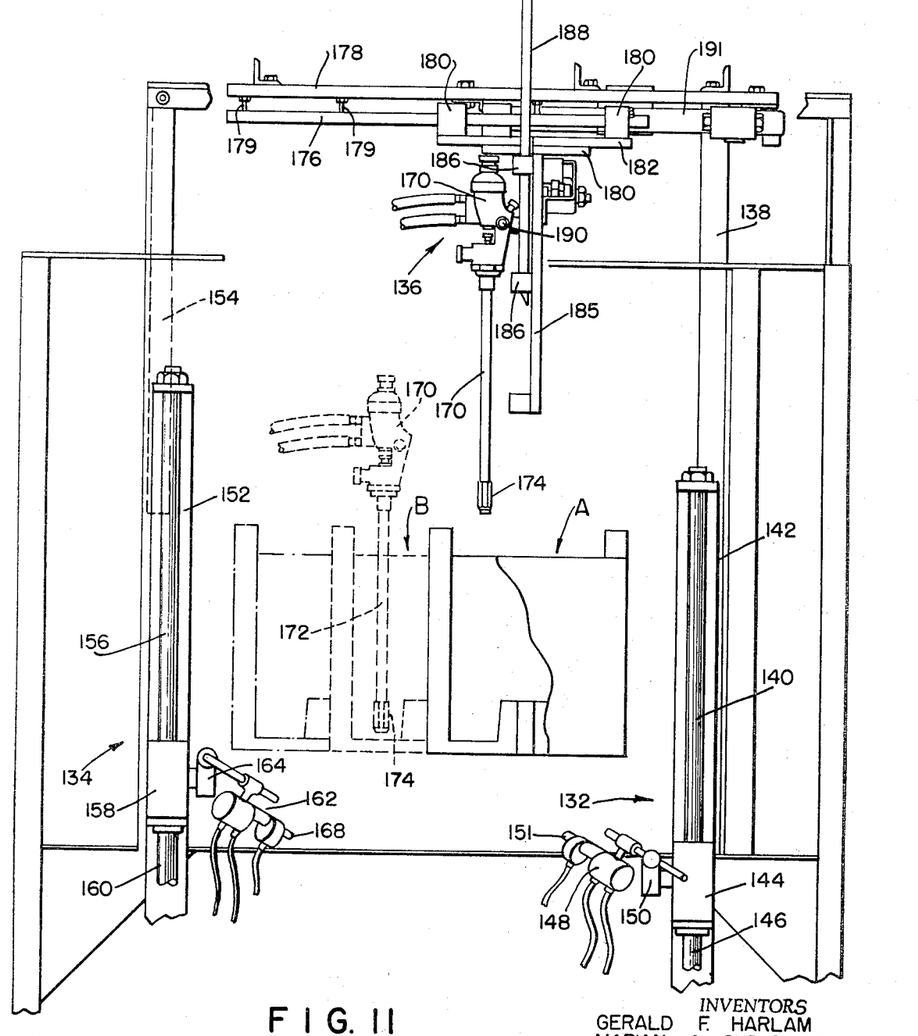
FIG. 11 is a front elevational view of the coating station showing the normal position of the spray gun assemblies upon introduction of the carrier into the coating station.

As the carrier 14 enters the coating station and passes the spray gun assembly 132 the location and position of which is shown in full lines in FIG. 11, and indicated at "A" the timer operates the appropriate solenoid valves for controlling the movement of the piston rods 146 and 160. These piston rods move as a unit to elevate the spray guns 148 and 162 therewith. As the spray guns 148 and 162 move upwardly, the appropriate solenoid valve for controlling the spraying operation of the gun 148 is actuated. Thus as the guns 148 and 160 move upwardly paint or coating material is ejected from the gun 148 in a generally upwardly direction to coat the sliders 50 as they rotate with the carrier 14. Since the nozzle 151 of the gun 148 is pointed in a generally upward direction, the underside of the outwardly extending tab elements 54 as well as the body portions 52 of the sliders receive the coating material thereon. It is seen that since the carrier 14 is continuously rotating as the spray gun 148 directs the coating material onto the sliders 50, a plurality of coats of the coating material are applied to the exposed slider surfaces. When the spray guns 148 and 162 reach the limit of upward travel thereof, as determined by the length of the movement of the blocks 144 and 158 on their slide rods 140 and 156, the spray gun 148 is automatically cut off and the guns are caused to dwell at the upper position thereof for a predetermined period. During this spraying operation of the first gun 148, the carrier 14 has continued to move with the conveyor 16 in a linear direction, and thus when the guns 148 and 160 reach the upper or elevated position thereof, the carrier is then located in the first dotted line or center position as indicated at "B" in FIG. 11. During the initial spraying of the sliders by the gun 148, the spray gun assembly 136 has been traversed at the same rate of speed as the carrier 14 by the cylinder 191 and along the length of the rods 176. When the spray gun 148 is cut off, the spray gun 170 is located directly above the carrier 14. At this point the cylinder 214 is operated to cause movement of the piston rod 212 and rack 204 operatively connected thereto. The rack 188 is thereafter moved downwardly carrying the spray gun 170 therewith, thereby lowering the nozzle 174 within the interior of the carrier. During this downward movement of the spray gun 170, the solenoid valve associated therewith is operated to control ejection of the coating material through the spray gun 170 and outwardly through the nozzles at the lower end of the spray head 172. The back portions 53 of the sliders located on the track 40 of the carrier 14 are thus effectively coated with the coating material. Upon completion of the downward movement of the spray gun 170, the cylinder 214 is then operated to rapidly withdraw the spray gun 170 which thereafter is moved to the initial position thereof as shown in full lines in FIG. 11 and indicated at "A." In the application of the coating material to the rear portion of the sliders by the spray gun 170, it is essential that the fan pattern of coating material ejected by the gun 170 reach those sliders that are located behind the ribs 34 in the slots 36. For this purpose the nozzle 174 of the spray gun 170 is disposed off-center with respect to the axis of the carrier 14 during the spraying operation. This position is illustrated in dotted lines at station "B" in FIG. 11. Thus the spray from the off-center spray gun nozzle 174 cannot be blocked by the ribs from entering the slots 36, and the entire rear portions of the sliders are effectively coated.

When the spray gun assembly 136 is moved to the original position thereof, the upwardly positioned spray gun 162 is operated to begin spraying of the coating material therefrom. Simultaneously the air cylinders associated with the spray gun assemblies 132 and 134 are actuated to begin the descent of guns 148 and 162. During this descending movement, the spray gun 148 is cut off and only the spray gun 162 is operated to direct the coating material onto the sliders. Since the nozzle 168 of the spray gun 162 is pointing in a generally downwardly direction, the upper surfaces of the outwardly extending tab elements of the sliders are effectively coated. It is understood, of course, that a second plurality of coats of coating material is applied to the front portions of the sliders 50. It will be noted that the rotational speed of the carrier 14 is effective to retain the tab elements 54 of the sliders 50 in the outwardly extending position thereof, the centrifugal force created by the rotating carrier counteracting the forces generated by the spraying of the coating material onto the tab elements 54. Thus even though there is a force exerted by the spraying material as it is directed onto the tab elements, the centrifugal force created by the rotation of the carrier 14 is sufficient to maintain the tab elements in their outwardly extending position.

After the spraying operation, the conveyor 16 which is still continuously moving, transfers the carrier 14 with the coated sliders thereon to the baking station 20 for the baking and drying of the sliders. It will be noted as seen in FIG. 1, that prior to the introduction of the carrier 14 into the baking station 20, the carrier 14 traverses through an open area between the coating station 18 and the baking station 20. This open area provides for a brief air drying period that initiates drying of the sliders prior to their entering the baking station. As seen in FIG. 1, the sliders continue to rotate with the carrier 14 as the drum carrier is transferred from the coating station 18 to the baking station 20. During transfer through the baking station the sliders are subjected to a baking temperature generated from a baking oven wherein the coating material on the sliders is hardened and cured as required. The length of the baking station will depend on the type of paint or enamel that is used during the coating operation and the other factors that normally affect the control of the baking ovens.

After the baking operation, the conveyor 16 moves the carrier 14 to the position opposite the unloading station 22, at which point the carrier 14 is lifted from the conveyor 16 and placed on a vibrating device at the unloading station. The track stop element 46 is pivoted to the open position and the coated sliders are then removed from the track 40 by vibration of the carrier 14. After removal of the sliders from the carrier, the carrier is then placed on the auxiliay conveyor 24 where it is transferred to the stripping station 26. The carrier is removed from the conveyor 24, placed in a tank containing a stripping medium and the coating material is then stripped from the carrier. Thereafter the carrier is available for placement at the loading station 12 and for loading of sliders thereon for carrying out the coating operation once again.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular form herein shown and described, except insofar as indicated by the scope of the appended claims.

What is claimed is:

1. In apparatus for coating articles that are constructed with a pivotally mounted element thereon, a carrier having a spirally extending peripheral track formed thereon, a loading station, means for mounting said articles on the spirally extending track of said carrier at said loading station in oriented relation such that the elements are normally disposed in depending relation, a coating station, means for rotating said carrier at said coating station at a rotational speed that is sufficient to pivotally elevate said depending elements upwardly under centrifugal force to a substantially horizontal, outwardly extending position, and means for applying a coating material to said articles at said coating station while the pivotal elements of said articles are located in their outwardly extending position, wherein all of the external surfaces of said articles are effectively coated.

2. In apparatus as set forth in claim 1, said coating applying means including a pair of coating applying devices that are located in spaced relation along the length of travel of said carrier at said coating station and being spaced sufficiently such that when said carrier is moved into the coating station, one device is loacted upstream of said carrier and the other device is located downstream thereof, means responsive to introduction of said carrier into said coating station for elevating said devices from a lower normal position to an upper position, and after a dwell period at the upper position moving said devices downwardly to the lower normal position said upstream device being arranged to direct the coating material onto said articles on said carrier only during the upward traveling movement thereof, and said downstream device being arranged to direct the coating material onto said articles on said carrier only during the downward movement thereof, the upwardly and downwardly directed coating material effectively coating the exterior surfaces of said articles including the outwardly extending pivotal portions thereof.

3. In apparatus for coating articles that are constructed with a pivotally mounted element thereon, a carrier on which said articles are mounted in oriented relation such that the elements are normally disposed in depending relation, means for transferring said carrier to a coating station, said carrier being simultaneously rotated during the transferring movement thereof and at a rotational speed that is sufficient to pivotally elevate the depending elements by centrifugal force to substantially a horizontal, upwardly extending position, means for applying a coating material to said articles at said coating station while the pivotal elements of said articles are located in their outwardly extending position, wherein all of the external surfaces of said articles are effectively coated, said carrier including a cylindrical member formed with a spirally extending peripheral trackway, and means for automatically loading said articles on the trackway of said carrier in oriented relation, the spiral formation of said peripheral trackway providing for loading of the articles in a continuous row from the lowermost end to the uppermost end of said carrier.

4. In apparatus as set forth in claim 3, said carrier including a circular base, a plurality of vertical ribs joined to said base and extending upwardly therefrom, a top ring mounted on said ribs and forming a unitary construction therewith and said base, and a continuous metallic strip joined to the exterior edges of said ribs and being disposed in wound helical relation thereon, the opposing edges of said strip in the wound position defining the continuous spirally extending peripheral trackway for receiving said articles thereon.

5. In apparatus as set forth in claim 3, said loading means including a first vibrating table on which an article hopper is mounted and a second vibrating table on which said carrier is mounted, said first table being vibrated to produce movement of articles deposited in said hopper in a predetermined pattern to properly orient said articles for being received on the trackway of said carrier, said second table being vibrated to produce movement of said articles that provides for maintaining a continuous flow of said articles from said hopper to said carrier and along the carrier trackway during the loading operation, and means for transferring said articles from said hopper to the trackway on said carrier.

6. In apparatus for coating articles, a carrier on which said articles are mounted, at least a portion of each article being pivotally movable in the mounted position on said carrier and the pivotal portion being normally disposed in depending relation, means for transferring said carrier to a coating station, means for rotating said carrier simultaneously with the transferring movement thereof, and at a rotational speed that is sufficient to pivotally elevate said pivotal portions of said articles by centrifugal force to substantially a horizontally, outwardly extending position, means for applying a coating material to the external surfaces of said articles at said coating station, the centrifugal force created by the rotation of said carrier being sufficient to counteract the forces exerted by application of said coating material for maintaining the pivotal portions of said articles in their outwardly extending position during the coating operation, said carrier having a spirally extending peripheral track formed thereon for receiving said articles in oriented relation, and means for loading said articles onto the peripheral track of said carrier, said loading means including a hopper into which said articles are deposited, means for vibrating said hopper to move said articles toward said carrier, means on said hopper for orienting the position of said articles so that they are received in oriented relation on said carrier, and means for vibrating said carrier for moving said articles along said spirally extending peripheral track during the loading operation.

7. In apparatus as set forth in claim 6, a bridge located between said hopper and carrier when said carrier is mounted on the vibrating means therefor, said bridge being independent of and disconnected from said hopper and carrier, said means for vibrating said hopper moving the oriented articles onto said bridge, and means for directing a stream of air under pressure over said bridge and in the direction of said carrier for transferring said articles from said bridge and onto the track of said carrier.

8. In apparatus as set forth in claim 6, said hopper orienting means including a selector track for receiving only those articles located in right-side-up position and a rejector member for permitting movement to said carrier only those articles on which the pivotal portion is located in oriented relation.

9. In apparatus as set forth in claim 6, said carrier having a generally cylindrical configuration that is defined by a base, a plurality of vertical ribs joined to said base, an upper ring mounted on said ribs, and a helically extending strip fixed to the exterior surfaces of said ribs and along the length of said carrier, the edges of said strip being spaced in the helical winding thereof to define said spirally extending peripheral track.

10. In apparatus for coating articles, a carrier on which said articles are mounted, at least a portion of each article being pivotally movable in the mounted position on said carrier and the pivotal portion being normally disposed in depending relation, means for transferring said carrier to a coating station, means for rotating said carrier simultaneously with the transferring movement thereof, and at a rotational speed that is sufficient to pivotally elevate said pivotal portions of said articles by centrifugal force to substantially a horizontally, outwardly extending position, means for applying a coating material to the external surfaces of said articles at said coating station, the centrifugal force created by the rotation of said carrier being sufficient to counteract the forces exerted by application of said coating material for maintaining the pivotal portions of said articles in their outwardly extending position during the coating operation, said coating applying means including a pair of coating applying devices that are located in spaced relation along the length of travel of said carrier at said coating station and being spaced sufficiently such that when said carrier is moved into the coating station, one device is located upstream of said carrier and the other device is located downstream thereof, means responsive to introduction of said carrier into said coating station for elevating said devices from a lower normal position to an upper position, and after a dwell period at the upper position moving said devices downwardly to the lower normal position, said upstream device being arranged to direct the coating material onto said articles on said carrier only during the upward traveling movement thereof, and said downstream device being arranged to direct the coating material onto said articles on said carrier only during the downward movement thereof, the upwardly and downwardly directed coating material effectively coating the exterior surfaces of said articles including the outwardly extending pivotal portions thereof, said carrier having a hollow configuration and being open at the upper end thereof and being further constructed with peripheral tracks that are spaced for receiving said articles thereon, wherein a portion of the article is exposed in the interior of said carrier, a third coating applying device movable independent of said pair of devices and normally located above said carrier, said third coating device being responsive to movement of said carrier into said coating station for translating for a limited distance therewith and movable, after movement of said upstream device to the upper position thereof, in a downward direction within said hollow carrier while simultaneously translating therewith for applying a coating material to the surfaces of said articles that are exposed in the interior of said carrier, said third coating device thereafter being elevated to the upper position and being withdrawn to its original position.

11. In apparatus for coating articles, a carrier on which said articles are located, means for moving said carrier to a coating station, means for rotating said carrier during movement thereof through said coating station, a first spray device located at said coating station and being positioned upstream of said carrier during the coating operation, a second spray device located at said coating station and being positioned downstream of said carrier during the coating operation, means for sequentially elevating and lowering said spray devices in unison after movement of said carrier into said coating station, said first spray device being responsive to introduction of said rotating carrier into said coating station for applying a first coat of coating material onto said articles mounted on said rotating carrier and during upward movement of said spray devices, said second spray device being responsive to lowering of said spray devices for applying a second coat of coating material onto said articles, said carrier having a hollow configuration and being open at the upper end thereof and being further constructed with peripheral tracks that are spaced for receiving said articles thereon, wherein a portion of the article is exposed in the interior of said carrier, a third spray device mounted for limited traversing movement in the same direction as that of said carrier, and means responsive to movement of said first and second spray devices to the elevated position thereof for moving said third spray device downwardly into the interior of said carrier, said third spray device during the downward movement thereof spraying a coat of coating material onto the surfaces of said articles that are exposed in the carrier interior.

12. In apparatus for coating articles, a hollow carrier being open at the upper end and having a peripheral track on which said articles are mounted, said track being constructed so that the articles are mounted thereon for the application of a coating material to the front and rear surfaces thereof, wherein said rear surfaces are disposed interiorly of said hollow carrier, means for rotating said carrier during the coating operation, a first spray means for ejecting said coating material onto the front surfaces of said articles, a second spray means for ejecting said coating material onto the rear surfaces of said articles, and means for moving said second spray means interiorly of said carrier and positioning said second spray means eccentrically with respect to the axis of said carrier so that the coating material ejected from said second spray means effectively coats all of the rear surfaces of said articles.

13. In a process for coating articles that are mounted on a carrier, wherein at least a portion of said articles is pivotally movable in the mounted position, comprising the steps of loading said articles on said carrier at a loading station, transferring said carrier from said loading station to a coating station, rotating said carrier at said coating station at a speed sufficient to move the pivotal portions of said articles under centrifugal force to an outwardly extending position, applying a coating material to said articles during the rotating movement of said carrier to coat all of the exposed surfaces of said articles, transferring the carrier to a baking station for exposing the coated surfaces of said articles to a baking temperature, rotating the carrier during the baking operation, and transferring said carrier from the baking station to an unloading station for removal of the coated articles therefrom.

14. In a process for coating zipper sliders, wherein each of said sliders is constructed with a pivotally mounted tab element thereon, comprising the steps of loading said sliders onto a carrier at a loading station in oriented relation thereon, wherein said tab elements are disposed in a free hanging depending position, transferring said carrier through a coating station and simultaneously rotating said carrier during the transfer thereof through said coating station, the rotational speed of said carrier being sufficient to pivotally move said tab elements upwardly under centrifugal force to an outwardly extending position, applying a coating material at said coating station onto said sliders during the rotating movement of said carrier for coating all of the exposed surfaces of said sliders, transferring the carrier to a baking station while the carrier is rotating for exposing the coated surfaces of said articles to a baking temperature, and transferring said carrier to an unloading station for removing the coated sliders therefrom.

15. In a process of coating zipper sliders, wherein each of said sliders is constructed with a pivotally mounted tab element thereon, comprising the steps of loading said sliders on a carrier in oriented relation thereon, wherein said tab elements are disposed in a free hanging depending position, moving said carrier to a coating station, rotating said carrier at said coating station at a speed that is sufficient to pivotally elevate said tab elements under centrifugal force, applying a coating material to said sliders at said coating station during the rotating movement of said carrier to coat the exposed surfaces of said sliders, baking the coated sliders, and unloading said coated sliders from said carrier at an unloading station.

16. In a process of coating zipper sliders as set forth in claim 15, rotating said carrier at said coating station at a speed that not only locates said tab elements in an elevated position but is sufficient to counteract the force created by the application of said coating material on said sliders for maintaining said tab elements in the elevated position during the coating operation.

17. In a process of coating zipper sliders as set forth in claim 16, applying a first coat of coating material on said sliders at said coating station from a first spray gun located upstream of said carrier and while said first spray gun is moving upwardly, and applying a second coat of coating material on said sliders at said coating station from a second spray gun located downstream of said carrier and while said second spray gun is moving downwardly.

18. In a process of coating zipper sliders as set forth in claim 15, loading said sliders on said carrier in oriented relation by vibrating a loading hopper to move said sliders in a predetermined flow pattern and vibrating said carrier so that sliders when received thereon from said loading hopper are moved in a predetermined flow pattern that provides for continuous flow of said articles from said loading hopper to said carrier.

19. In a carrier on which articles are loaded for the coating thereof, a circular base having a bearing member mounted therein for receiving a mounting shaft of a carrier transfer device, a plurality of vertically extending ribs joined to said base adjacent to the periphery thereof and in spaced angular relation, an upper ring fixed to the uppermost ends of said ribs and defining the top of said carrier, and a helically extending peripheral track formed on said carrier for receiving said articles thereon, said track being continuous in length and extending from the upper end of said carrier to the lower end thereof.

20. In a carrier on which a plurality of zipper sliders are mounted for the processing thereof, a cylindrical member having a body portion to which a base is joined, said body portion being open at the upper end thereof, a helically extending trackway formed in the body portion and extending from the upper end of said carrier to the lower end thereof and being adapted to accommodate said zipper sliders thereon.

21. In a carrier as set forth in claim 20, a continuously extending spiral metallic strip mounted on said body portion, the adjacent edges of said metallic strip being spaced apart to define the helically extending trackway.

22. In a carrier as set forth in claim 21, a plurality of vertically extending ribs joined to said base and projecting upwardly therefrom, each of said ribs being formed with a plurality of spaced grooves therein, the grooves in each rib being vertically staggered with respect to the grooves in the other ribs, said metallic strip being secured to the ribs and said trackway defined by said strip communicating with the grooves in said ribs, the staggering of said grooves in the ribs providing for continuous extension of said trackway as it extends helically from the upper end of said carrier to the lower end thereof.

23. In apparatus for loading zipper sliders onto a carrier for the processing of said sliders, a circular hopper for receiving sliders therein, means for vibrating said hopper for causing said sliders to move in a predetermined pattern therein, said hopper including at least one selector track having a selector blade that receives the moving sliders thereon only if the tab elements of the sliders are disposed in an upwardly facing direction, said track including an opening through which the sliders fall upon rejection by said selector blade, said selector track communicating with a pick-up track that directs said sliders toward said carrier, and a rejector bar located adjacent to said pick-up track for preventing said sliders from being directed onto said carrier unless they are located such that the tab elements are oriented for location exteriorly of said carrier when said sliders are mounted thereon.

24. In apparatus as set forth in claim 23, a bridge located between said hopper and said carrier and disconnected therefrom, said bridge including a track that is aligned with said pick-up track and receives sliders advancing thereon, said bridge being a track formed on said carrier, and means located adjacent to said bridge for directing air under pressure in a direction toward said carrier, wherein said sliders received on the bridge track are propelled by said air under pressure onto the carrier track.

References Cited
UNITED STATES PATENTS

| | | | |
|---|---|---|---|
| 2,253,286 | 8/1941 | Cronan | 211—115 |
| 2,434,176 | 1/1948 | Potthoff | 118—321 X |
| 2,547,884 | 4/1951 | Paasche | 118—321 X |
| 3,226,254 | 12/1965 | Reuschel | 118—503 X |

RALPH S. KENDALL, *Primary Examiner.*

CHARLES R. WILSON, *Assistant Examiner.*

U.S. Cl. X.R.

117—101, 105.4; 118—52, 314, 321, 323, 500; 198—33; 211—163